INVENTOR.
ERLING L. LIEN
ATTORNEY

United States Patent Office 3,450,930
Patented June 17, 1969

3,450,930
PERMANENT MAGNET FOCUSED LINEAR BEAM TUBE EMPLOYING A COMPENSATING MAGNET STRUCTURE BETWEEN THE MAIN MAGNET AND THE BEAM COLLECTOR
Erling L. Lien, Los Altos, Calif., assignor to Varian Associates, Palo Alto, Calif., a corporation of California
Filed Nov. 14, 1966, Ser. No. 594,071
Int. Cl. H01j 25/34
U.S. Cl. 315—3.5         8 Claims

ABSTRACT OF THE DISCLOSURE

A permanent magnet focused linear beam tube is disclosed. The tube includes a main permanent magnet for producing an axially directed magnetic field over a substantial portion of the beam path for confining the electron beam to a desired path through an interaction circuit. The external fringing field of the main permanent magnet produces an undesired beam focusing effect in the collector structure preventing proper defocusing and spreading of the beam therein. A small compensating permanent magnet is disposed along the beam path between the main permanent magnet structure and the collector structure. The compensating magnet is oppositely polarized to the main permanent magnet such that its main magnetic field is in field aiding relation to the fringing field of the main permanent magnet and its external fringing field is in opposition to the fringing field of the main magnet in the collector region. In this manner, a relatively small compensating permanent magnet may be employed for canceling the relatively large fringing fields of the main magnet in the collector region to provide proper beam spreading therein.

---

Figure 1:
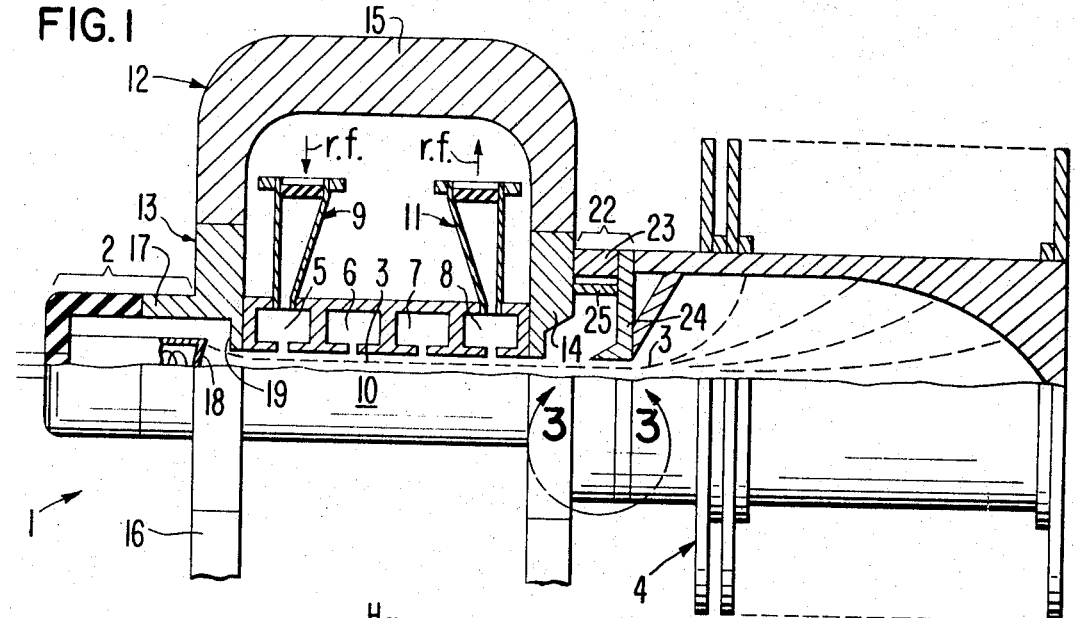

Heretofore, permanent magnet focused klystron amplifiers have employed bulky and heavy magnetic shields around the beam collector structure to shield the interior of the beam collector from the fringing magnetic fields of the permanent magnet used to generate the beam focusing magnetic field as of 1600 gauss. This shielding structure is relatively large and heavy, as it surrounds the collector including the collector coolant jacket. In an air cooled collector structure, the surrounding shielding structure becomes prohibitively large for many portable applications. If the collector structure is made of a magnetic permeable material, such as soft iron, to reduce the size of the shielding structure, the collector is found to have impaired thermal transfer to the coolant, thereby requiring the size of the collector structure to be increased, thus, defeating the purpose of the composite shield and collector structure.

Moreover, the collector shielding structure increases the amount of stored magnetic field outside of the beam focusing region, thereby reducing the focusing field intensity requiring a larger magnet for a given beam focusing field intensity.

In solenoid focused klystrons, an auxiliary solenoid or permanent magnet has been employed surrounding the beam collector structure for canceling the small fringing field of the solenoid which permeates the beam collector. While such an auxiliary magnet is useful for solenoid focused tubes, where the leakage field is on the order of a few 10's of gauss, it is unsuited for permanent magnet focused tubes, where the leakage field is on the order of 100's of gauss. To cancel the 100's of gauss in the collector, the surrounding auxiliary magnet would have to be prohibitively large for many applications.

In the present invention, the leakage field from the main permanent magnet is canceled by an auxiliary compensating permanent magnet structure located between the collector pole piece of the main magnet and the entrance of the beam collector structure, whereby the compensating magnet structure can closely surround the beam to reduce its size and weight. The auxiliary magnet structure is polarized opposite to the polarization of the main magnet. This polarization of the auxiliary magnet aids the main magnetic field at its ends and also aids the leakage field in the region between the collector pole piece of the main magnet and the collector pole piece of the auxiliary magnet. However, the leakage field of the auxiliary magnet cancels the leakage field of the main magnet in the collector region and, thus, does away with necessity for the magnetic shield.

A relatively small auxiliary magnet structure of the present invention reduces the leakage field of the main magnet in the collector region from on the order of hundreds of gauss to less than 20 gauss, thereby permitting the beam to expand in the collector in order to obtain a more uniform power density distribution over the beam collector surfaces. Uniform power distribution permits use of a lighter collector structure for the same power handling capability or permits increased power output for a collector of a given size. Moreover, cancellation of the leakage flux and elimination of the collector shield permits a reduction in the total weight of the magnetic structure of tubes of a given power level.

The principal object of the present invention is the provision of an improved permanent magnet beam focusing structure for linear beam tubes.

One feature of the present invention is the provision of an auxiliary permanent magnet structure located along the beam path between the main permanent magnet and the beam collector structure, the auxiliary magnet being oppositely polarized relative to the main magnet such that the leakage field of the auxiliary magnet cancels the leakage field of the main magnet in the collector region, whereby strong magnetic fields in the collector are eliminated to permit the beam to expand for uniform power distribution over the beam collecting surfaces of the collector and to permit use of a smaller magnet for a tube of a given power level.

Another feature of the present invention is the same as the preceding feature wherein the main permanent magnet includes a collector pole piece structure and the auxiliary magnet structure includes a collector pole piece structure, and the auxiliary permanent magnet is disposed in-between the two collector pole piece structures.

Figure 2:
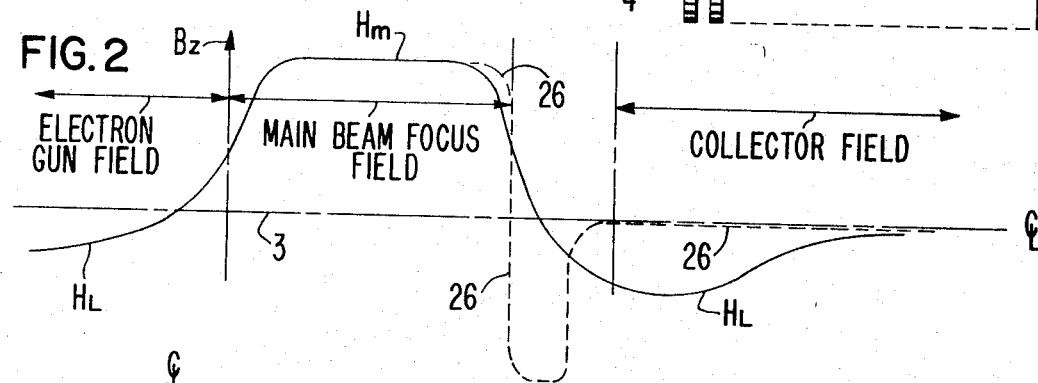
Figure 3:
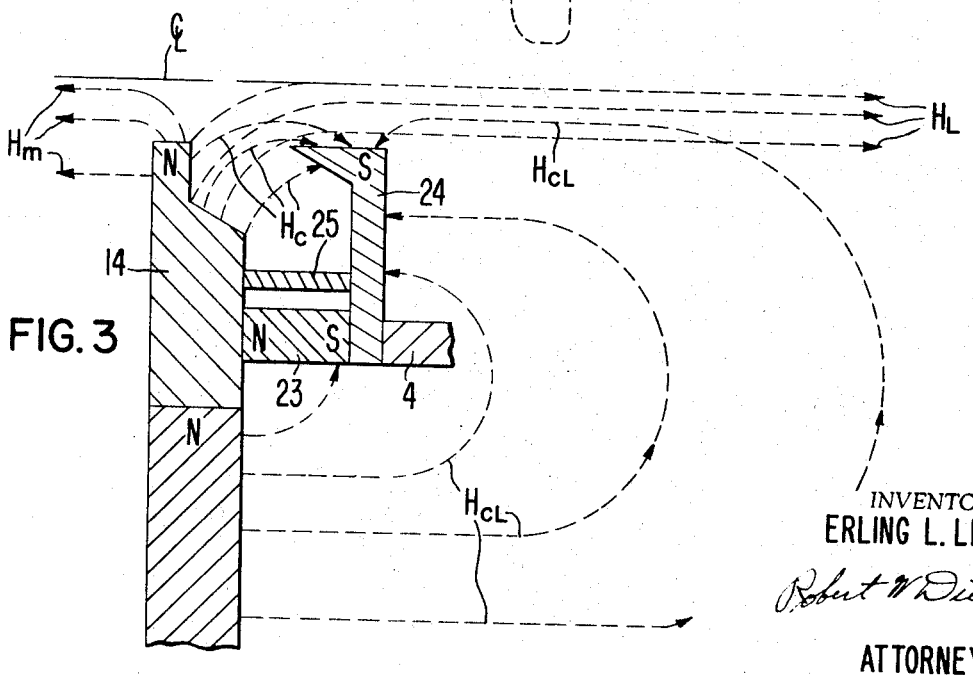

Other features and advantages of the present invention will become apparent upon a perusal of the following specification taken in connection with the accompanying drawings wherein:

FIGURE 1 is a longitudinal view, partly in section, of a microwave tube employing the compensating magnet structure of the present invention, FIGURE 2 is a plot of axial magnetic field strength versus axial position along the beam path for the tube of FIGURE 1, and FIGURE 3 is a detail sectional view of the magnet structure and field patterns for a portion of the structure of FIGURE 1 delineated by line 3—3.

Referring now to FIGURE 1 there is shown a microwave high power klystron amplifier tube 1 employing features of the present invention. More particularly, the tube 1 includes an electron gun assembly 2 for forming and projecting a beam of electrons over an elongated beam path 3 to a beam collector structure 4. A plurality of cavity resonators 5, 6, 7 and 8 are formed in a conductive block 10, as of copper, and successively disposed along the beam path 3 for successive electromagnetic interaction with the beam passable therethrough. An input waveguide structure 9, in wave energy communication with the first or input resonator 5, excites the input resonator 5 with microwave signal wave energy to be amplified. The fields of the input resonator 5 velocity modulates the beam with signal energy. The successive buncher cavities 6 and 7 are excited by the modulated beam for further velocity modulation of the beam to amplify the signal modulation on the beam. The modulated beam excites the output cavity resonator 8 and amplified microwave signal energy is extracted from the output resonator 8 via an output waveguide 11 and fed to a suitable utilization device, such as a radar antenna, not shown.

A beam focusing magnet structure 12 serves to provide an axially directed magnetic field, as of 2000 gauss (see FIGURE 2), over the beam path between the electron gun 2 and beam collector structure 4. The magnet structure 12 includes a pair of annular pole pieces, cathode pole piece 13 and collector pole piece 14, as of soft iron. A pair of C-shaped permanent magnets 15 and 16 are affixed in-between the pole pieces 13 and 14 for energizing the pole pieces.

The pole pieces 13 and 14 are shaped to provide a uniform axial magnetic field $B_Z$ along the beam path 3 between the pole pieces 13 and 14 and through the beam field interaction structure comprising resonators 5-8 to focus the beam against space charge repulsion tending to expand the beam and, thus, prevents unwanted beam interception.

In a confined electron flow tube, the cathode pole piece structure 13 includes an axial projection 17 surrounding the cathode emitter 18 of the gun assembly 2. This projection shapes the magnetic field lines in the eletcron gun region to pass through the emitter and to coincide with the electron flow lines between the anode 19 and cathode 18.

The collector pole piece structure 14 is shaped to terminate the beam focusing magnetic field lines passing axially of the tube between the pole piece structures 13 and 14. A leakage field $H_L$ is also produced by the beam focusing magnet structure 12. This leakage field passes between the pole structures 13 and 14 around the outside the magnet structure 12 and is oppositely directed of the beam focusing magnetic field $H_m$ on the beam axis. This leakage field is found to have a substantial amplitude in the beam collector structure 4 as of, for example, a peak magnitude as high as 25% of the intensity of the beam focusing field $H_m$. Such a strong leakage field in the collector structure prevents the beam from expanding causing the beam to impinge on a very small area of the collector thereby exceeding the power density capability of the collector and causing melting of the collector. As a result, air rushes into the tube and the tube is destroyed.

Prior attempts to remove this leakage field from the collector structure 4 have involved the use of large magnetic shields around the collector structure 4 or use of a bucking solenoid or permanent magnet around the collector structure 4. However, due to the relatively large diameter of the collector structure 4 these prior shields and magnets have had to be relatively large and heavy making them impractical for many portable applications for the tube.

In the present invention, an auxiliary magnet structure 22, which has a relatively small diameter, is disposed around the beam path 3 between the collector pole piece structure 14 and the collector structure 4. The auxiliary magnet structure 22 includes a cylindrical permanent magnet structure 23 and an annular collector pole piece structure 24, as of soft iron, to which the collector structure 4 is joined. A tubular envelope segment 25 is joined between poles 14 and 24 to complete the vacuum envelope of the tube 1.

The auxiliary permanent magnet 23 (see FIGURE 3) is oppositely polarized to the polarization of magnets 15 and 16 of the beam focusing magnet structure 12. Thus, the auxiliary magnet structure produces a compensating magnetic field $H_C$ along the center line of the tube 1 which adds to the main focusing magnetic field in-between the pole piece structures 13 and 14 and which also adds to the leakage field $H_L$ in the spaces between the collector pole piece structure 14 and the auxiliary collector pole piece structure 24. However, the leakage field $H_{CL}$ of the auxiliary magnet 22 cancels the leakage field $H_L$ of the main magnet 12 in the collector structure 4. As a result, the total axial field intensity, as a function axial position along the center line of the tube 1, is as shown by the dotted line 26 of FIGURE 2. From FIGURE 2 it is seen that the total axial field intensity in the collector region is reduced to a very low intensity as of, for example, to less than 20 gauss peak intensity as compared to an uncompensated peak field intensity of 500 gauss.

This small residual field is insufficient to cause appreciable focusing of the beam in the collector structure 4 thereby permitting the beam 3 to expand in the collector and to distribute its energy more uniformly over the beam collector surface. Although the intensity of the compensating magnetic field $H_C$ may exceed the intensity of the main beam focusing magnetic field, the gap length over which this field is produced is much shorter than the gap of the main field and, therefore, the auxiliary magnet structure 22 is much smaller than the main magnet structure 12.

In the case of a confined flow gun, the length of the compensating magnetic field gap is, for example, less than 25% of the length of the main beam focusing field gap and the diameter of the auxiliary magnet 23 is substantially less than the diameter of the main beam focus magnets 15 and 16. Thus, the weight and size of the auxiliary permanent magnet 23 is less than 25% of the weight and size of the main permanent magnets 15 and 16. Also the relatively small diameter tubular envelope segment 25 permits the auxiliary magnet 23 to be located externally of the vacuum envelope of the tube 1.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A linear beam tube including, means for forming and projecting a beam of electrons over an elongated beam path, means at the terminal end of the beam path forming a beam collector structure for collecting and dissipating the energy of the beam, means forming an electronic interaction circuit structure disposed along the beam path intermediate said beam forming and collecting means for electronic interaction with the beam to produce an output, means forming a permanent magnet structure for focusing the electron beam through said interaction circuit, said permanent magnet structure having a pair of magnetic poles axially spaced apart along the beam path for producing the beam focusing magnetic field therebetween, said permanent magnet structure having a substantial leakage flux between said pair of poles in a path which passes through said collector structure and around the outside of said permanent magnet structure, means forming an auxiliary permanent magnet structure disposed between said collector structure and the nearest pole of said pair of magnetic poles, said auxiliary magnet structure being magnetically polarized in opposition to the beam focusing magnet structure such that the magnetic field produced by said auxiliary magnet structure on the beam axis in the region between said nearest magnet pole and said collector is in aiding relation to the leakage flux from said beam focusing magnet and such that the leakage flux from said auxiliary magnet is in bucking relation to the leakage flux from said beam focusing magnet in said collector structure, whereby the leakage field from said auxiliary magnet structure cancels the leakage field from said beam focusing magnet structure in said collector structure to permit beam spreading in said collector.

2. The apparatus of claim 1 including, means forming an evacuated envelope structure enclosing the beam path, and wherein said nearest magnetic pole of said beam focusing magnet structure and said auxiliary magnet structure each include a magnetically permeable pole piece structure axially spaced from each other along the beam path and extending through and forming a part of said evacuated envelope structure, and both of said permanent magnet structures each including a permanent magnet portion disposed outside of said envelope structure and connected to their respective pole piece structures.

3. The apparatus of claim 2 wherein said beam focusing magnetic field is in excess of 1000 gauss and has a peak leakage field to be canceled in said collector in excess of 100 gauss, and wherein said auxiliary magnet produces a leakage field which cancels the leakage field of said beam focus magnet in said collector structure to a total peak field intensity of less than 30 gauss.

4. The apparatus of claim 2 wherein said axially spaced pole piece structures which extend through said envelope structure are annular soft iron structures.

5. The apparatus of claim 4 wherein said parmanent magnet portion of said auxiliary magnet structure is a hollow cylindrical structure coaxially positioned of the beam path and interposed between said pair of annular soft iron pole piece structures.

6. The apparatus of claim 5 wherein said electronic interaction circuit includes a plurality of cavity resonators successively arranged along the beam path for successive electronic interaction with the beam to produce a microwave output signal.

7. The apparatus of claim 2 wherein said auxiliary permanent magnet member has a weight which is less than 25% of the weight of said beam focusing permanent magnet portion.

8. The apparatus of claim 5 wherein the spacing between said pair of annular pole piece structures is less than 25% of the axial length of the beam focusing magnetic field measured along the beam path.

References Cited

UNITED STATES PATENTS

| | | | |
|---|---|---|---|
| 2,306,875 | 12/1942 | Fremlin | 315—5.35 |
| 2,853,641 | 9/1958 | Webber | 315—3.5 |
| 3,153,743 | 10/1964 | Meyerer | 315—5.35 X |
| 3,297,907 | 1/1967 | La Rue et al. | 315—5.38 X |
| 3,368,102 | 2/1968 | Saharian | 315—3.5 X |

ELI LIEBERMAN, *Primary Examiner.*

SAXFIELD CHATMON, JR., *Assistant Examiner.*

U.S. Cl. X.R.

313—84; 315—5.35, 5.38; 335—211